United States Patent [19]

Matsumoto et al.

[11] 4,292,944
[45] Oct. 6, 1981

[54] INTAKE CONTROL SYSTEM FOR INTERNAL COMBUSTION ENGINE

[75] Inventors: Hiromitsu Matsumoto, Haamatsu; Keiichi Sugiyama, Shizuoka; Kazuo Uchiyama, Hamamatsu, all of Japan

[73] Assignee: Yamaha Hatsukoki Kabushiki Kaisha, Iwata, Japan

[21] Appl. No.: 119,211

[22] Filed: Feb. 7, 1980

[30] Foreign Application Priority Data

Feb. 8, 1979 [JP] Japan ............................ 54-14066

[51] Int. Cl.³ ............................................ F02M 13/06
[52] U.S. Cl. .................................... 123/432; 123/308; 261/DIG. 68
[58] Field of Search ............... 123/127, 52 M, 52 MF, 123/75 B, 119 R, 30 C, 432, 308; 261/23 A, 65 R, 39 A, DIG. 68, 65

[56] References Cited

U.S. PATENT DOCUMENTS

| | | | |
|---|---|---|---|
| 1,727,265 | 9/1929 | Aseltine | 123/119 R |
| 2,028,585 | 1/1936 | Blake | 123/119 R |
| 2,080,440 | 5/1937 | Scott | 261/65 |
| 2,656,166 | 10/1953 | Foster | 261/DIG. 68 |
| 2,656,167 | 10/1953 | Phillips | 261/DIG. 68 |
| 3,174,731 | 3/1955 | Kalert | 261/DIG. 68 |
| 3,472,211 | 10/1969 | Meininger | 261/41 D |
| 3,543,736 | 12/1970 | Suzuhi | 123/119 R |
| 3,935,842 | 2/1976 | Ishizawa | 123/52 MF |
| 4,186,706 | 2/1980 | Matsumoto | 123/75 B |

FOREIGN PATENT DOCUMENTS 1153559 5/1969 United Kingdom ............ 123/52 M

*Primary Examiner*—Ronald H. Lazarus
*Attorney, Agent, or Firm*—Ernest A. Beutler

[57] ABSTRACT

An induction system for an internal combustion engine that improves efficiency through increasing flame propagation at low and medium speeds and loads. This is accomplished through the use of a relatively small cross sectional area auxiliary induction system through which at least a portion of the charge requirements are supplied. The small cross sectional area causes the charging to be introduced at a high velocity, thus increasing turbulence in the intake charge to promote rapid flame propagation when the spark plug is fired. At least a portion of the idle charge is also delivered through the main induction passage so as to reduce the velocity of the intake charge. The charge delivered through the main induction system flows at an angle to that discharged from the auxiliary induction system so that the two flow paths will create internal turbulence due to their different directions.

7 Claims, 3 Drawing Figures

INTAKE CONTROL SYSTEM FOR INTERNAL COMBUSTION ENGINE

BACKGROUND OF THE INVENTION

This invention relates to an internal combustion engine and more particularly to an improved induction system for such an engine.

It has recently been proposed to improve the efficiency and emission control of an internal combustion engine by introducing the idle and low speed charge to the chambers through a relatively small auxiliary induction system. The use of such an auxiliary induction system increases the turbulence in the chamber at the time of combustion and thus promotes rapid flame propagation and improved efficiency. In some instances, however, the velocity of the intake charge may be too high, particularly at idle and combustion is retarded due to the unduly high velocity of the charge passing the spark plug at the time of ignition. Nevertheless, it is still desirable to maintain a high degree of turbulence in the chamber even at the idle speed.

The aforenoted problem also may be present with certain types of combustion chambers such as the wedge type where the combustion chamber also adds to the turbulence at the time the spark plug fires.

It is, therefore, a principle object of this invention to provide an improved induction system for an internal combustion engine.

It is another object of this invention to provide an induction system for an internal combustion engine that increases turbulence in the intake charge at low speeds without deterioration in combustion efficiency.

SUMMARY OF THE INVENTION

A first feature of this invention is adapted to be embodied in an induction system for an internal combustion engine having a chamber of variable volume in which combustion occurs. Both main and auxiliary induction passages are provided for delivering respective charges to the chamber. The auxiliary induction passage has a substantially lesser effective cross sectional area than the main induction passage so that a given mass flow of charge entering the chamber through the auxiliary induction passage will flow at a significantly higher velocity. Valve means are also provided for controlling the ratio of communication between the induction passages and the chamber during a given cycle of operation. The valve means is effective to provide substantially all of the idle and low speed charge requirements of the chamber through the auxiliary induction passage and an increasing proportion of the charge requirements through the main induction passage as the engine speed and load increase. In conjunction with this feature of the invention, means are provided for reducing the velocity of the charge entering the chamber through the auxiliary induction passage when the engine is operating at its idle condition.

Another feature of this invention is also adapted to be embodied in an induction system for an internal combustion engine. First and second intake means are provided for delivering a charge to the chamnber. The first and second intake means are oriented relative to each other to coact and induce turbulence to the charges as delivered to the chamber through the intake means.

DETAILED DESCRIPTION OF THE PREFERRED EMBDIMENTS

Figure 1:
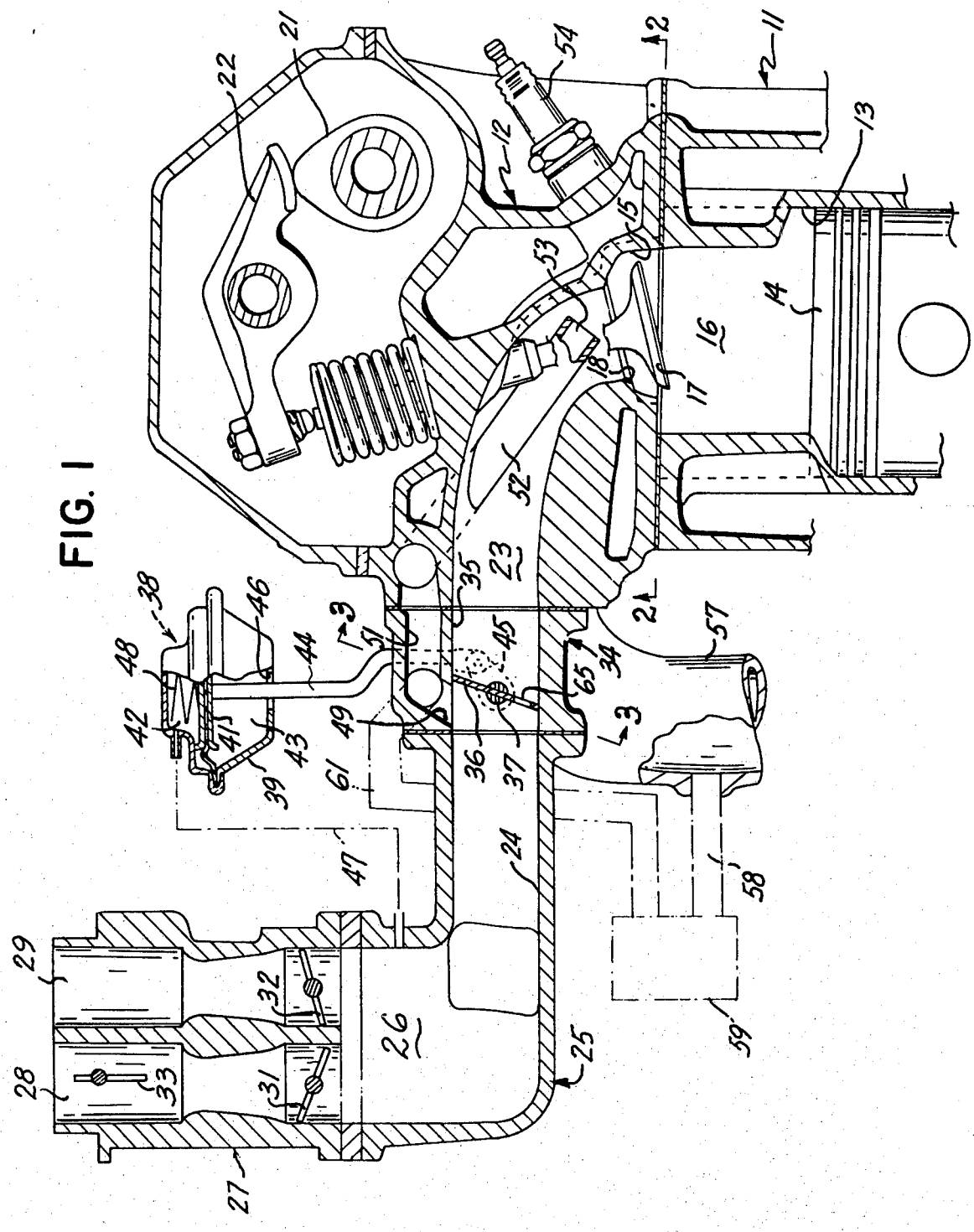
FIG. 1 is a vertical cross sectional view taken through a single cylinder of a multi cylinder internal combustion engine embodying this invention.

In the drawings a multiple cylinder internal combustion engine embodying this invention is depicted. The engine includes a cylinder block 11 to which a cylinder head 12 is affixed in any known manner. The cylinder block 11 is formed with a number of cylinder bores 13 in which pistons 14 are supported for reciprocation in a known manner. Only the construction associated with a single cylinder bore and piston will be described because it is believed readily apparent to those skilled in the art how the invention is applied to multiple cylinders.

The cylinder head 12 is formed with a cavity 15 which forms a wedge or bath tub shaped combustion chamber along with the piston 14 and cylinder bore 13. As is well known, the total volume of the chamber, which is indicated generally by the reference numeral 16, will vary as the piston 14 reciprocates in the cylinder bore 13. The chamber 16 will, at times, be referred to as the combustion chamber.

Positioned in the cylinder head cavity 15 is an intake valve 17 and an exhaust valve (not shown). The intake and exhaust valves control the flow through intake and exhaust ports 18 and 19 in a known manner. The valves are operated by means of an overhead mounted camshaft 21 and rocker arms 22.

A main intake passage 23 is formed in the cylinder head 12 and terminates in the main intake port 18 for each cylinder. The main intake passage 23 is served by a runner 24 of an intake manifold, indicated generally by the reference numeral 25. The intake manifold 25 has a plenum or inlet chamber 26 that is served by a two stage, two barrel carburetor, indicated generally by the reference numeral 27. The carburetor 27 is of the conventional progressive type and includes a primary side 28 and a secondary side 29. Primary and secondary throttle valves 31 and 32 are positioned in the barrels 28 and 29 and are operated sequentially in any manner as is well known with such carburetors. A choke valve 33, which is also operated in any known manner, is provided in the primary barrel 28.

Interposed between the intake manifold 25 and the cylinder head 12 is a valve block, indicated generally by the reference numeral 34. The valve block 34 is provided with main intake passages 35 which interconnect the mainfold runners 24 with the individual cylinder head main intake passages 23. A control valve 36 is rotatably supported in each passage 35 upon a control valve shaft 37 for controlling the flow through the main intake passages 23 of the cylinder head 12. The position of the control valves 36 is controlled by a vacuum responsive actuator 38. The actuator 38 consists of an outer housing 39 in which a diaphragm 41 is positioned to divide the housing 39 into a vacuum chamber 42 and an atmospheric chamber 43. A link 44 interconnects the diaphragm 41 with the control valve shaft 37 for rotating the latter in repsonse to the load on the engine, as will become apparent. For this purpose, the link 44 is pivotly connected to a lever 45 that is affixed to the control valve shaft 37.

The actuator atmospheric chamber 43 is exposed to atmospheric pressure by means of a clearance 46 that exists between the link 44 and the housing 39. The vacuum 42 is exposed to induction system pressure at the plenum section 26 of the manifold 25 by means of a conduit, indicated schematically at 47. A compression spring 48 is positioned in the vacuum chamber 42 for exerting a biasing force on the diaphragm 41 in a direction which tends to open the control valves 36.

When the control valves 36 are closed the intake charge is shunted to an auxiliary induction system consisting of an inlet 49 that is positioned in the valve body 34 on the upstream side of the control valve 36. The inlet 49 feeds an auxiliary induction passage 51 that is formed in the valve block 34 and cylinder head 12 and which terminates in a nozzle 52 having an auxiliary intake passage discharge port 53. The auxiliary discharge port 53 communicates with the main intake passage 23 upstream of the main intake port 12. Thus, the auxiliary intake passage 51 discharges into the main intake passsage 23. The point of discharge is however, sufficiently proximate to the chamber 16 so that the auxiliary intake charge is delivered to the chamber 16 at substantially undiminished velocity when the intake valve 17 is opened.

Figure 2:
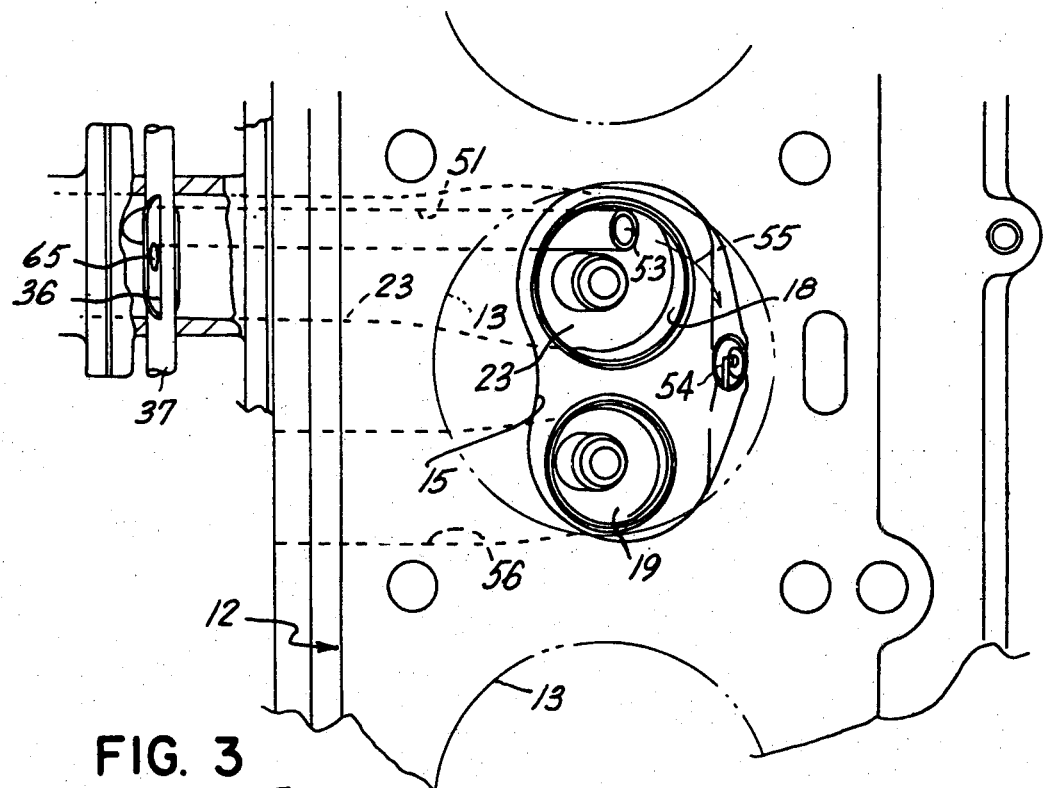
FIG. 2 is a cross sectional view taken along the line 2—2 of FIG. 1 and shows generally the configuration of the combustion chamber in the cylinder head. Portions of this figure are also broken away to show the control valve.

A spark plug 54 is positioned in each chamber 16 for firing the charge. As will be apparent from an inspection of the drawings and particularly FIG. 2, the charge entering the chamber 16 through the auxiliary intake port 53 flows in a generally swirling direction as indicated by the arrow 55 and this charge tends to flow across the gap of the spark plug 54 at the time of ignition.

The exhaust ports 19 serve exhaust passages 56 formed in the cylinder head 12, which exhaust passages deliver the burnt combustion products to an exhaust mainfold 57. The main intake passages 23 and exhaust passages 56 pass through the same side of the cylinder head 12 and lie adjacent each other so as to establish a counter flow type head arrangement. If desired, the engine may be provided with an EGR system for recirculating a portion of the exhaust gasses back to the combustion chamber 16 for controlling combustion temperature and reducing the emission of nitrous oxides. Such an EGR system is shown schematically in phantom lines and includes a passage 58 that extends from the exhaust manifold 57 to an EGR valve, indicated schematically at 59. The EGR valve 59 discharges through a passage 61 that is in communication with the auxiliary induction passage 51 adjacent the inlet 49. By virtue of this arrangement, the exhaust gasses that are recirculated will be introduced into the chamber 16 at a high velocity through the auxiliary induction system consisting of the passages 51, nozzles 52 and ports 53.

In operation, when the engine is running under an idle condition, there will be a substantially high vacuum in the intake manifold downstream of the carburetor throttle valves 31 and 32. This high vacuum is transmitted through the conduit 47 to the actuator vacuum chamber 48. Thus, the atmospheric pressure acting in the chamber 43 will urge the diaphragm 41 upwardly to the position shown in FIG. 1 and the control valves 36 will be fully closed. Substantially all of the intake charge will be delivered to the chambers 16 through the auxiliary induction system. Since the auxiliary induction system has a substantially lesser effective cross sectional area than the main induction system a given mass flow of charge delivered to the chambers 16 will flow at a significantly higher velocity. This high velocity induction will create turbulence in the chamber 16 at the time of ignition of the spark plug 54. This increased turbulence will cause rapid flame propagation and smooth and efficient combustion. At idle, the velocity of the intake charge issuing from the auxiliary intake port 53 may be too high and under such circumstances could adversely affect ignition. Such high velocities can have the effect of "blowing out" the spark from the plug 54. This problem is more acute with combustion chambers in which turbulence is generated during the compression stroke such as by the use of squish areas as in the chamber 16 of the illustrated embodiment.

In order to reduce the velocity of the charge flowing through the auxiliary intake port 53 at idle and low speed operation, a bypass passge 65 is provided in the control valve 36. In the illustrated embodiment, the bypass passage 65 comprises a circular hole formed in the body of the valve. A predetermined amount of air flow, dependent upon the size of the passage 65, will flow into the chamber 16 through the main cylinder head induction passage 23. This will reduce the amount of charge delivered through the auxiliary intake port 53 and, accordingly, its velocity.

Even though the velocity of the charge delivered by the auxiliary intake port 53 is reduced by the bypass passage 65, turbulence and, accordingly, flame propagation rate may be maintained by orienting the bypass passage 65 relative to the auxiliary intake port 53 in such a way that the flow through each of these passages intersect each other and induce turbulence to the intake charge flowing through the main intake port 18. This can be done consistent with reducing the rate of swirl and velocity. In this way, rapid flame propagation can be established and maintained without quenching of the gap of the spark plug 54 at the time of ignition.

As the engine and load speed increase due to progressive opening of the carburetor primary throttle valve 31, the vacuum in the intake manifold plenum 26 will decrease. Eventually the vacuum will decrease (absolute pressure will increase) to the point at which the pressure acting in the chamber 42 coupled with the action of the spring 48 will overcome the affect of the atmospheric pressure acting in the chamber 43 to open the control valve 36. When this occurs, an increasing proportion of the charge to the chambers 16 will be supplied through the main induction system. Under these running conditions, the additional turbulence provided by the auxiliary induction system is not necessary to insure rapid flame propagation and efficient combustion and exhaust gas emission control.

In conjunction with a preferred embodiment of the engine, the rate of the spring 48 and size of the passages is such that the control valve 36 begins to open at approximately one-quarter of the engine maximum output. In a specific application of this invention to an automotive vehicle, this occurs when the vehicle is operating at road load conditions at approximately 120 kilometers per hour. Of course, other applications may result in other desirable points at which the control valves 36 begin to open.

Figure 3:
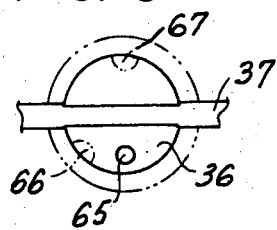
FIG. 3 is a cross sectional view taken along the line 3—3 of FIG. 1 and shows the configuration of the control valve.

It should be readily apparent that the described construction is particularly useful in increasing turbulence in the combustion chamber at idle and low speeeds so as to improve combustion efficiency and economy. These results are achieved, even with high turbulence combustion chambers, without adversely affecting combustion emission under such conditions. In the illustrated embodiment, an arrangement is provided in which a separate control valve is provided for each cylinder head induction passage. It should be readily apparent to those skilled in the art that the features of this invention can be used with engines in which a single control valve operates in conjunction with all or a plurality of intake ports. With such arrangements, the control valve 36 would be positioned in the plenum area of the manifold rather than in the individual runners. Also, in the illustrated embodiment, the auxiliary induction system includes nozzles 52 which are press fitted into the cylinder heads. The invention is equally susceptible of use in engines where the auxiliary induction passages are formed by cored or machine formed passages directly in the cylinder head. Also, in the illustrated embodiment, the flow past the control valve has been provided by a hole 65 in the control valve body. The same result could be achieved by appropriately positioned notches formed in the periphery of the control valve, such as those shown in the phantom line positions 66 and/or 67 of FIG. 3. Preferably, if these cut-outs are positioned in the periphery of the control valve body, they should be located above its lower peripheral edge. Various other changes and modifications may be made without departing from the spirit and scope of the invention, as defined by the appended claims.

What is claimed is:

1. In an induction system for an internal combustion engine having a chamber of variable volume in which combustion occurs, main induction passage for delivering a charge to said chamber, an auxiliary induction passage for delivering a charge to said chamber, said auxiliary induction passage having a substantially lesser effective cross-sectional area than said main induction passage so that a given mass flow of charge delivered to said chamber through said auxiliary induction passage will enter said chamber at a significantly greater velocity, valve means for controlling the ratio of communication between said induction passages and said chamber during a given cycle of operation, said valve means being effective to direct substantially all of the idle charge flow to said chamber through said auxiliary induction passage, said valve means comprising at least a butterfly type throttle valve for controlling the flow through said main induction passage, the improvement comprising a relief formed in said butterfly type throttle valve formed at a location spaced above its lower peripheral edge for reducing the velocity of the charge entering said chamber through said auxiliary induction passage when said engine is operating at its idle condition, said relief being oriented so that the charge flowing therethrough when said butterfly type throttle valve is substantially closed will intersect the charge introduced to said chamber through said auxiliary induction passage to increase the turbulence in said chamber.

2. An induction system for an internal cumbustion engine as claimed in claim 1 wherein the chamber is substantially open and a spark plug is positioned in the open portion of the chamber, the charge entering said chamber from each of the induction passages being substantially undiminished in velocity from the point of discharge thereof.

3. An induction system for an internal combustion engine as claimed in claim 2 wherein the auxiliary induction passage having its inlet in communication with said main induction passage upstream of the butterfly type throttle valve.

4. An induction system for an internal combustion engine as claimed in claim 3 wherein the relief comprises a hole in the valve.

5. An induction system for an internal combustion engine as claimed in either claim 3 or claim 4 wherein the auxiliary induction passage and the main induction passage each terminates in a respective auxiliary and main intake ports, said auxiliary intake port being in communication with said main induction passage upstream of said main intake port.

6. An induction system in an internal combustion engine as claimed in claim 1 wherein the flow of charge to the chamber through the relief intersects the flow to said chamber through the auxiliary induction passage at an angle.

7. An induction system as set forth in claim 1, 2, 3 or 6 wherein the chamber is configured so as to increase the turbulence in said chamber as it approaches the end of its compression cycle.

* * * * *